United States Patent
Di et al.

(10) Patent No.: US 9,442,317 B2
(45) Date of Patent: Sep. 13, 2016

(54) DISPLAY DEVICE HAVING SPECIFIC STRUCTURE OF ADHESIVE FRAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shuanhu Di, Beijing (CN); Zhihui Zeng, Beijing (CN); Haiwei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 14/492,484

(22) Filed: Sep. 22, 2014

(65) Prior Publication Data

US 2015/0323827 A1 Nov. 12, 2015

(30) Foreign Application Priority Data

May 9, 2014 (CN) ............... 2014 2 0237047 U

(51) Int. Cl.
*G02F 1/1335* (2006.01)
*G02F 1/1333* (2006.01)

(52) U.S. Cl.
CPC ....... *G02F 1/133308* (2013.01); *G02F 1/1336* (2013.01); *G02F 2001/133311* (2013.01); *G02F 2001/133317* (2013.01)

(58) Field of Classification Search
CPC ................... G02F 1/133308; G02F 1/133512; G02F 2202/28; G02F 2001/133317
USPC ........................................................ 349/122
See application file for complete search history.

(56) References Cited

U.S. PATENT DOCUMENTS

2002/0130998 A1* 9/2002 Kim .................. G02F 1/133308
349/122
2011/0236643 A1* 9/2011 Tsubouchi ........ G02F 1/133308
428/192

* cited by examiner

*Primary Examiner* — Karabi Guharay
(74) *Attorney, Agent, or Firm* — Harness, Dickey & Pierce, P.L.C.

(57) ABSTRACT

A display device according to the present disclosure may include a display panel, a backlight source disposed at the light-entering side of the display panel and an adhesive layer laminated between the display panel and the backlight source. The adhesive layer may have a frame structure and may be disposed at the periphery of the display area of the display panel. The frame structure may have at least one opening, so that the adhesive layer may have an unclosed frame structure.

16 Claims, 4 Drawing Sheets

DISPLAY DEVICE HAVING SPECIFIC STRUCTURE OF ADHESIVE FRAME

CROSS-REFERENCE TO RELATED APPLICATIONS

This application claims the priority of the Chinese Patent Application Serial No. 201420237047.5 filed in China on May 9, 2014, the entirety of which is herein incorporated by reference.

TECHNICAL FIELD

The present disclosure relates to the field of a liquid crystal display technique, in particular to a display device.

BACKGROUND

In the laminating process of a display module, since a display panel has a rigid structure, in order to achieve that there is no bubble defect occurred in the laminating process of the rigid structure, it generally needs to perform the vacuum treatment on the laminating environment by using a vacuum pump during the laminating process.

The laminating process of the display module in the prior art will be explained below by taking the lamination between a backlight source and a liquid crystal screen as an example.

In the prior art, a light-blocking adhesive tape between the backlight source and the liquid crystal screen is a closed ring-shape tape. When the tape is adhered between the backlight source and the liquid crystal screen, it is caused that there is a closed space occurred between the two. When the laminating process is performed, since the air around the periphery of the module is vacuumed, the gas pressure on the closed space between the backlight source and the liquid crystal screen may cause the two to explode easily, thereby causing the defect of a product.

SUMMARY

The present disclosure provides a display device, so as to solve the problem that the defect of a product may be formed since the pressure difference may cause the rigid structure to explode easily in the vacuum laminating process of two rigid structures.

In order to solve the above-described problem, the present disclosure provides a display device, which includes a display panel, a backlight source disposed at a light-entering side of the display panel and an adhesive layer laminated between the display panel and the backlight source. The adhesive layer may have a frame structure and may be disposed at the periphery of a display area of the display panel. Besides, the frame structure may have at least one opening.

For example, in the above-described display device, the frame structure may be of an axial symmetry.

For example, the frame structure may have two openings, and the two openings may be distributed symmetrically at two sides of the symmetry axis of the frame structure.

For example, in the above-described display device, the adhesive layer may have a rectangular structure.

For example, the two openings may be distributed symmetrically at two sides of a symmetry axis of the rectangular structure.

For example, in the above-described display device, the adhesive layer may be a light-blocking adhesive tape, and the light-blocking adhesive tape may form a first end face and a second end face fitted with each other at the opening in an opposite manner.

For example, at least a part of the first end face is disposed towards inside of the frame structure.

For example, in the above-described display device, the first end face and the second end face may be parallel folded faces.

For example, in the above-described display device, the first end face may be a folded face formed by being folded twice, and the second end face may be a folded face formed by being folded twice.

For example, in the above-described display device, the first end face may have a convex part and a concave part, and the second end face may have a convex part and a concave part. The convex part of the first end face may be fitted and inserted into the concave part of the second end face, and the convex part of the second end face may be fitted and inserted into the concave part of the first end face.

For example, in the above-described display device, the first end face and the second end face may be parallel inclined faces.

For example, in the above-described display device, the first end face and the second end face may be parallel curved faces.

For example, in the above-described display device, all the openings of the frame structure may have the same shape.

The beneficial effects of the above-described technical solutions provided by the present disclosure are as follows.

In the above-described technical solutions, by configuring the adhesive layer laminated between the display panel and the backlight source to have an unclosed frame structure, there is no pressure difference between the space between the display panel and the backlight source and the ambient environment when the vacuum treatment is performed during the laminating process. Thereby, it is avoided that the screen-exploding phenomenon for the display panel and the backlight source may be caused by the pressure difference during the vacuum laminating process.

BRIEF DESCRIPTION OF THE DRAWINGS

In order to illustrate the technical solutions according to the embodiments of the present disclosure or in the prior art more clearly, drawings to be used in the description of the embodiments or the prior art will be described briefly hereinafter. Apparently, the drawings described hereinafter are only some embodiments of the present disclosure, and other drawings may be obtained by those skilled in the art according to those drawings without creative works.

DETAILED DESCRIPTION

Figure 1:
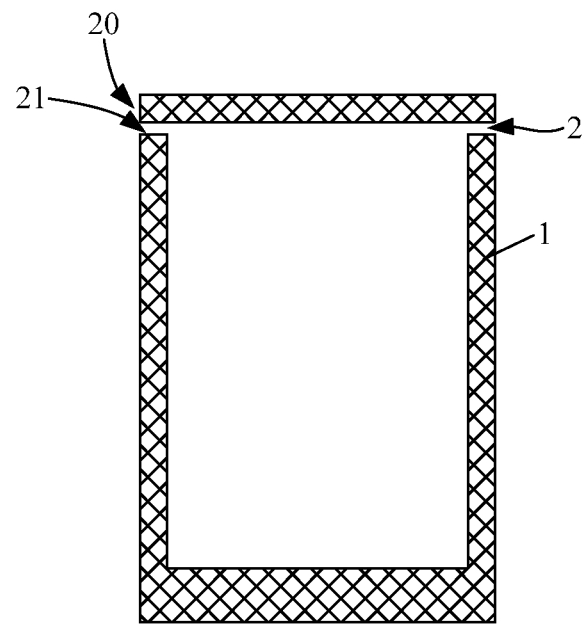
FIG. 1 shows a first structural schematic diagram of an adhesive layer laminated between a display panel and a backlight source according to an embodiment of the present disclosure.

In technical solutions of the present disclosure, by configuring the adhesive layer laminated between the display panel and the backlight source to have an unclosed frame structure, there is no pressure difference between the space between the display panel and the backlight source and the ambient environment when the vacuum treatment is performed during the laminating process. Thereby, it is avoided that the screen-exploding phenomenon for the display panel and the backlight source may be caused by the pressure difference during the vacuum laminating process.

The specific embodiments of the present disclosure will be described in detail below in conjunction with accompanying diagrams and embodiments. The following embodiments will be used to explain the present disclosure, but not used to limit the scope of the present disclosure.

As shown in FIGS. 1, 2, 4, 6, a display device 100 according to an embodiment of the present disclosure includes a display panel 110, a backlight source 120 disposed at a light-entering side of the display panel 110 and an adhesive layer 1 laminated between the display panel 110 and the backlight source 120. The display panel 110 includes a display area and a non-display area disposed around the periphery of the display area. The adhesive layer 1 may have a frame structure, and may be disposed at the periphery of the display area of the display panel. In order to prevent the light-leaking from the display area, the adhesive layer 1 may be an adhesive tape. Furthermore, the tape may typically be a light-blocking adhesive tape. Of course, the present disclosure is not limited thereto, and other materials may also be selected to form the adhesive layer 1 according to the actual needs.

Specifically, the frame structure may have at least one opening 2, so that the adhesive layer 1 forms an unclosed area. Thus, there is no pressure difference between the space between the display panel and the backlight source and the ambient environment when the vacuum treatment is performed during the laminating process for the display panel and the backlight source. Thereby, it is avoided that the screen-exploding phenomenon for the display panel and the backlight source may be caused by the pressure difference during the vacuum laminating process.

Optionally, the frame structure may be of an axial symmetry. The frame structure may have two openings 2, and the two openings 2 may be distributed symmetrically at two sides of the symmetry axis of the frame structure. Taking it as an example that the adhesive layer 1 may have a rectangular structure, the two openings 2 may be distributed symmetrically at two sides of the symmetry axis of the rectangular structure. Specifically, the two openings 2 may be disposed at one side of the rectangular structure, or may be disposed at the two opposite sides of the rectangular structure, but the present disclosure is not limited thereto. By forming two symmetric openings 2 on the frame structure, it can guarantee the flow property of air during vacuum treatment in the laminating process, so that the flow of air is well-balanced, and thus it is not easy to cause the deformation of the adhesive layer 1.

It is easy for those skilled in the art to infer that, a more even-number of openings 2 may also be arranged on the frame structure, and pairs of two openings 2 may be distributed symmetrically at two sides of the symmetry axis of the frame structure. However, in order to simplify the making process and the laminating process of the adhesive layer 1, it can typically satisfy the needs that two openings 2 are designed on the frame structure.

Figure 2:
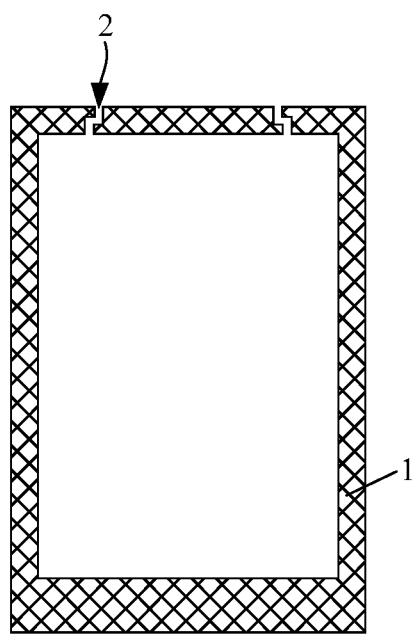
FIG. 2 shows a second structural schematic diagram of an adhesive layer laminated between a display panel and a backlight source according to an embodiment of the present disclosure.
Figure 3:
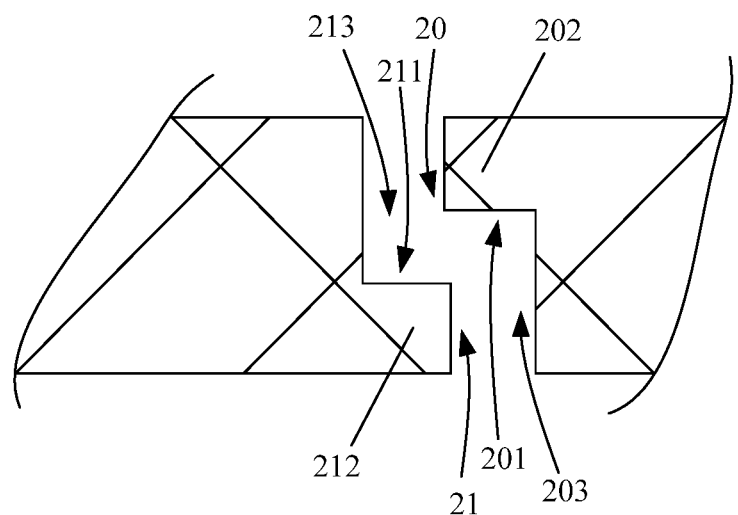
FIG. 3 shows a partially enlarged schematic diagram of the adhesive layer shown in FIG. 2 at an opening.

In an embodiment of the present disclosure, as shown in FIGS. 2 and 3, the adhesive layer 1 may be designed to form a first end face 20 and a second end face 21 fitted with each other at the opening 2 in an opposite manner. Specifically, the first end face 20 may have at least a part thereof (201 as shown in FIG. 3) towards the inside of the frame structure, making the part 201 not parallel with the emitting direction of the light rays from the display area (the direction of the light rays from the display area emitting from the inside of the frame structure to the outside of the frame structure, the emitting direction of the light rays from the display area referred to in the following will all be referred to as this direction), so as to block the emitting of the light rays from the display area through an opening 2. Furthermore, the inside of the frame structure may be referred to as an area surrounded by the frame structure.

Furthermore, for a part 211 of the second end face 21 opposite to the part 201 of the first end face 20, by designing the two parts 201 and 211 not to be completely staggered in the direction perpendicular to the emitting direction of the light rays from the display area, it can effectively block the emitting of the light rays from the display area of the display panel, and thus it is avoided that the light-leaking phenomenon occurs in the display area through an opening 2. Since the emitting direction of light rays from the display area is typically perpendicular to sides of the frame structure at which the opening 2 is disposed, the two parts 201 and 211 may be specifically designed not to be completely staggered in an extending direction of the side of the frame structure at which the opening 2 is disposed.

The specific implementation structure of the present disclosure will be explained below by taking several specific embodiments as examples.

In a specific embodiment, as shown in FIG. 3, the first end face 20 and the second end face 21 of the adhesive layer 1 may be parallel folded faces. For example, the first end face 20 may be a folded face formed by being folded twice, and the second end face 21 may also be a folded face formed by being folded twice. Accordingly, the first end face 20 may specifically have a convex part 202 and a concave part 203, and the second end face 21 may specifically have a convex part 212 and a concave part 213. The convex part 202 of the first end face 20 may be fitted and inserted into the concave part 213 of the second end face 21, and the convex part 212 of the second end face 21 may be fitted and inserted into the concave part 203 of the first end face 20. The above structure can avoid that the light-leaking phenomenon occurs in the display area through an opening 2, and meanwhile it can prevent the defect caused by the dust entering the display area.

Figure 4:
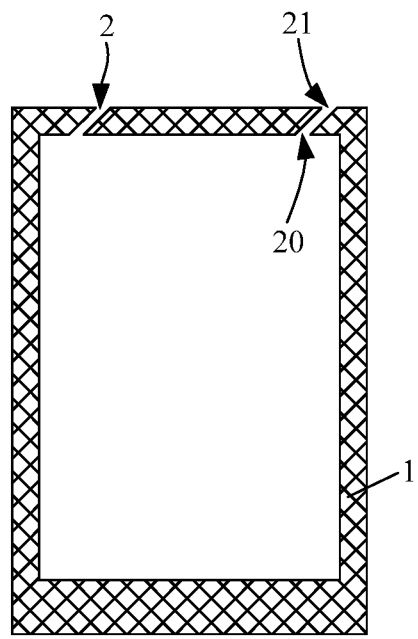
FIG.4 shows a third structural schematic diagram of an adhesive layer laminated between a display panel and a backlight source according to an embodiment of the present disclosure.

In another specific embodiment, as shown in FIG. 4, the first end face 20 and the second end face 21 of the adhesive layer 1 may be parallel inclined faces. Specifically, the first end face 20 is towards the inside of the frame structure. By designing the first end face 20 and the second end face 21 not to be completely staggered in an extending direction of a side of the frame structure at which the opening 2 is disposed, it can effectively block the emitting of the light rays from the display area of the display panel, and thus it is avoided that the light-leaking phenomenon occurs in the display area through the opening 2.

Figure 5:
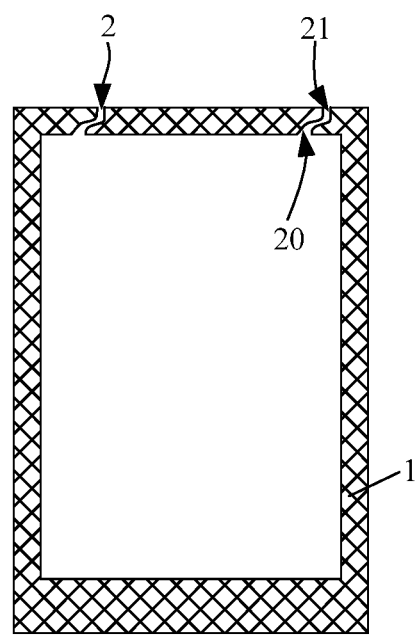
FIG. 5 shows a fourth structural schematic diagram of an adhesive layer laminated between a display panel and a backlight source according to an embodiment of the present disclosure.
Figure 6:
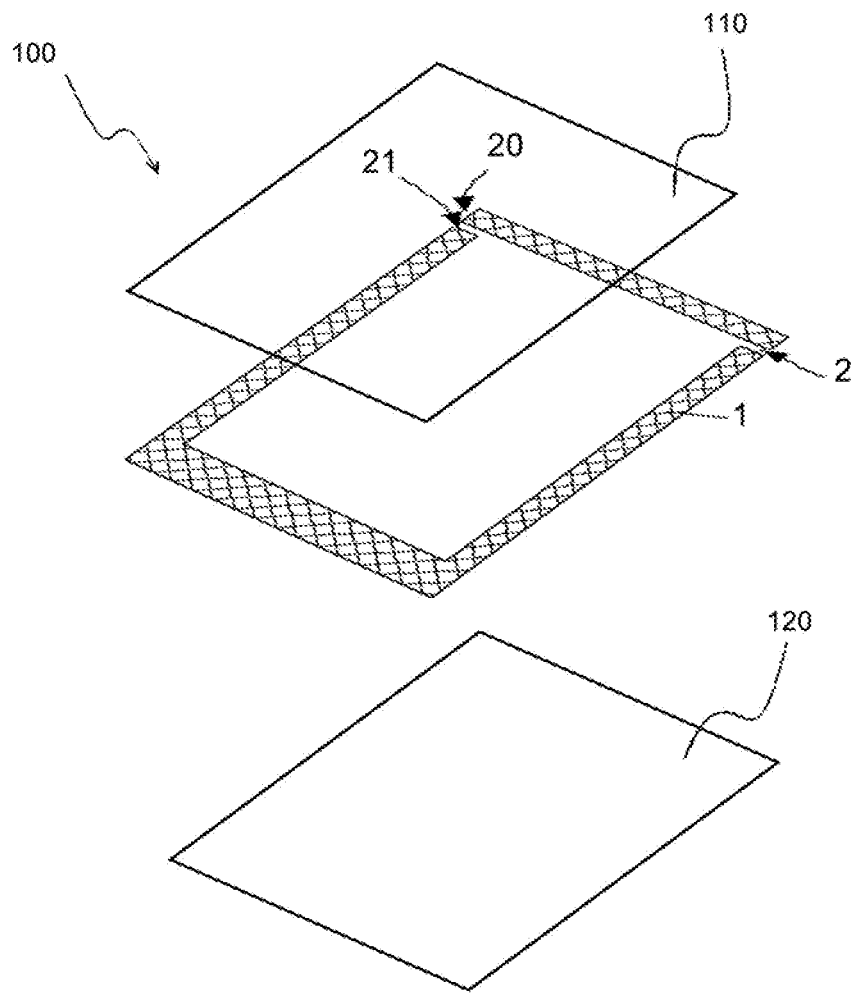
FIG. 6 shows a structural schematic diagram of a display device according to an embodiment of the present disclosure.

In another specific embodiment, as shown in FIG. 5, the first end face 20 and the second end face 21 of the adhesive layer 1 may be parallel curved faces. Specifically, a part of the first end face 20 is towards the inside of the frame structure. The second end face 21 may have a part thereof opposite to the said part of the first end face 20. By designing the two parts not to be completely staggered in an extending direction of a side of the frame structure at which the opening 2 is disposed, it can effectively block the emitting of the light rays from the display area of the display panel, and thus it is avoided that the light-leaking phenomenon occurs in the display area through the opening 2. Meanwhile, it can also prevent the defect caused by the dust entering the display area.

In the above-described specific embodiments, it can simplify the manufacturing process of the adhesive layer 1 by designing the first end face 20 and second end face 21 to be parallel.

Of course, the opening 2 may also be designed to be parallel with the emitting direction of the light rays from the display area. Furthermore, as shown in FIG. 1, by designing the opening 2 to be disposed at an end of a side of the frame structure to make the first end face 20 not opposite to the second end face 21, the light-leaking phenomenon for the display area of the display panel can be alleviated.

In the actual production, it can simplify the manufacturing process by designing all the openings 2 of the frame structure to have the same shape. A diameter of openings 2 should be reduced as much as possible, and the dust pollution and light-leaking caused by openings 2 may be alleviated.

In the technical solutions of the present disclosure, by configuring the adhesive layer laminated between the display panel and the backlight source to have an unclosed frame structure, there is no pressure difference between the space between the display panel and the backlight source and the ambient environment when the vacuum treatment is performed during the laminating process. Thereby, it is avoided that the screen-exploding phenomenon for the display panel and the backlight source may be caused by the pressure difference during the vacuum laminating process.

Those described above are only embodiments of the present disclosure. It should be noted that, for those skilled in the art, improvements and substitutions may also be made without departing from the principle of the present invention. Those improvements and substitutions should also be considered as within the scope of the present invention.

What is claimed is:

1. A display device, comprising:
a display panel;
a backlight source disposed at a light-entering side of the display panel; and
an adhesive layer laminated between the display panel and the backlight source, the adhesive layer having a frame structure and being disposed at the periphery of a display area of the display panel,
wherein the frame structure has at least one opening;
wherein the adhesive layer is a light-blocking adhesive tape, the light-blocking adhesive tape forming a first end face and a second end face fitted with each other at the opening in an opposite manner; and
wherein the first end face and the second end face are parallel folded faces and have a step-like folded face respectively.

2. The display device according to claim 1, wherein the frame structure is of an axial symmetry.

3. The display device according to claim 2, wherein the frame structure has two openings, the two openings being distributed symmetrically at two sides of the symmetry axis of the frame structure.

4. The display device according to claim 3, wherein the adhesive layer has a rectangular structure.

5. The display device according to claim 4, wherein the two openings are distributed symmetrically at two sides of a symmetry axis of the rectangular structure.

6. The display device according to claim 4, wherein at least a part of the first end face is disposed towards inside of the frame structure.

7. The display device according to claim 2, wherein at least a part of the first end face is disposed towards inside of the frame structure.

8. The display device according to claim 1, wherein at least a part of the first end face is disposed towards inside of the frame structure.

9. The display device according to claim 1, wherein the first end face is a folded face formed by being folded twice.

10. The display device according to claim 1, wherein the second end face is a folded face formed by being folded twice.

11. The display device according to claim 1, wherein the first end face has a convex part and a concave part, and the second end face has a convex part and a concave part.

12. The display device according to claim 11, wherein the convex part of the first end face is fitted and inserted into the concave part of the second end face, and the convex part of the second end face is fitted and inserted into the concave part of the first end face.

13. The display device according to claim 1, wherein the first end face and the second end face are parallel inclined faces.

14. The display device according to claim 1, wherein the first end face and the second end face are parallel curved faces.

15. The display device according to claim 1, wherein all the openings of the frame structure have the same shape.

16. The display device according to claim 1, wherein the display panel has a rigid structure.

* * * * *